US012588128B2

(12) United States Patent
Lee et al.

(10) Patent No.: US 12,588,128 B2
(45) Date of Patent: Mar. 24, 2026

(54) WARNING LIGHT CONTROL CIRCUIT CAPABLE OF PREVENTING START-UP FLASHING

(71) Applicant: ESUSE AUTO PARTS MANUFACTURING CO., LTD., New Taipei City (TW)

(72) Inventors: Ting-Fang Lee, New Taipei City (TW); Wen-Chung Han, New Taipei City (TW)

(73) Assignee: ESUSE AUTO PARTS MANUFACTURING CO., LTD., New Taipei City (TW)

( * ) Notice: Subject to any disclaimer, the term of this patent is extended or adjusted under 35 U.S.C. 154(b) by 44 days.

(21) Appl. No.: 18/663,428

(22) Filed: May 14, 2024

(65) Prior Publication Data

US 2025/0358919 A1 Nov. 20, 2025

(51) Int. Cl.
*H05B 47/17* (2020.01)

(52) U.S. Cl.
CPC .................................... *H05B 47/17* (2020.01)

(58) Field of Classification Search
CPC ...... H05B 47/00; H05B 47/10; H05B 47/105; H05B 47/155; H05B 47/165; H05B 47/17
See application file for complete search history.

(56) References Cited

U.S. PATENT DOCUMENTS 5,621,277 A * 4/1997 Ricca .................... H05B 47/10 315/86
2008/0258631 A1* 10/2008 Wu ........................ H05B 39/08 315/129

* cited by examiner

*Primary Examiner* — Thai Pham
(74) *Attorney, Agent, or Firm* — MUNCY, GEISSLER, OLDS & LOWE, P.C.

(57) ABSTRACT

A warning light control circuit capable of preventing start-up flashing, which has a start-up flash prevention circuit including active switch, current limiter, first shunt resistor and second shunt resistor set between warning light control IC and Data Bus. The active switch has the gate coupled between first and second shunt resistors, the source coupled to ground point and the drain coupled to the positive terminal of current limiter. The other end of first shunt resistor is coupled to Input Voltage Source. The other end of second shunt resistor is coupled to ground point. The negative terminal of current limiter is coupled to Data Bus. When the warning light control circuit starts to turn on, the starting pulse wave of Data Bus is blocked by current limiter to prevent warning light control IC from being turned on instantaneously.

14 Claims, 5 Drawing Sheets

WARNING LIGHT CONTROL CIRCUIT CAPABLE OF PREVENTING START-UP FLASHING

BACKGROUND OF THE INVENTION

1. Field of the Invention

The present invention provides a warning light control circuit capable of preventing start-up flashing, in particular, it refers to a start-up flash prevention circuit composed of active switch, current limiter and first and second shunt resistors. When the warning light control circuit starts to turn on, the starting pulse wave of Data Bus is blocked by current limiter. The gate of active switch is coupled to first and second shunt resistors and the Input Voltage Source to provide a conduction signal. The drain of active switch is coupled to the Signal Processor Power Supply to obtain Data, Clock Pulse and ID Information, and select one of the Flash Modes to flash the light. Through the above-mentioned circuit structure, the pulse wave at the startup moment will not cause the warning lights to flash, but the user can successfully execute the warning light operation after selecting the Flash Mode.

2. Description of the Related Art

Warning lights are used in many environments and places, such as road construction warnings, public places safety warnings, high-rise building safety warnings, fire trucks, ambulances and police vehicles, etc. The warning lights can be divided into a single warning light or a light device composed of multiple warning lights. The light device is mostly installed on the roof of the aforementioned vehicles that need to be warned. The prior art light devices need to add an electronic control device to control multiple warning lights to achieve the warning effect of coordinating the flashing of multiple warning lights. At present, the appearance and flashing effect of all warning lights on the market are almost the same. However, the flashing effect of multiple warning lights controlled by an electronic control device is not very coordinated, and it also causes the warning effect to be poor. In addition, the warning lights on the market added additional electronic control device also increases the manufacturing cost, and the terminal sales price of the light device also increases, which is not conducive to the price competitiveness in the sales market. Therefore, how to try to solve the above-mentioned deficiencies and inconveniences of prior art light device is the direction that relevant industries urgently want to study and improve.

Furthermore, for police vehicles used to fight crime, they must remain stealthy when tracking criminals and make them difficult to detect, and police officers must wait until the time is right before turning on the light device to make arrests. However, due to poor circuit design of commercially available light devices when the police car is on standby, the starting pulse wave drives the light device when the police car is started. The light device first flashes for one cycle and then goes out and returns to the standby state of the light device. However, a flash of light may cause criminals to notice and escape, which will only increase the difficulty of chasing criminals. Based on the above shortcomings, it needs to be developed and improved by those engaged in this industry.

SUMMARY OF THE INVENTION

Therefore, in view of the above-mentioned problems and deficiencies, the inventor collected relevant information, and after multiple evaluations and considerations, he designed the invention of this a warning light control circuit capable of preventing start-up flashing.

The main object of the present invention is to provide a warning light control circuit capable of preventing start-up flashing, which comprises a signal processor, a control circuit, and a warning light control IC. The signal processor has stored the data of a plurality of Flash Modes therein. The signal processor uses the numbers of the Flash Modes to simultaneously set the ID Number of each of a plurality of warning lights, and set a predetermined ID Number of the warning lights as a Starter and the rest of the ID Numbers as Receivers. The control circuit comprises at least one control signal source. The control signal source is coupled to an active switch. The output end of the active switch coupled to a control input side of the signal processor through a Control Bus.

The warning light control IC is coupled to a plurality of warning lights and coupled with the signal processor to a Data Bus through a data output side. A start-up flash prevention circuit provided between the warning light control IC and the Data Bus. The start-up flash prevention circuit comprises an active switch, a current limiter, a first shunt resistor and a second shunt resistor. The gate of the active switch coupled between the first shunt resistor and the second shunt resistor. The opposite end of the first shunt resistor coupled to an Input Voltage Source. The opposite end of the second shunt resistor coupled to a ground point. The source of the active switch also coupled to the ground point. The drain of the active switch coupled to the positive terminal of the current limiter. The negative terminal of the current limiter coupled to the Data Bus. When the warning light control circuit starts to turn on, the starting pulse wave of the Data Bus is blocked by the current limiter to prevent the warning light control IC from being turned on instantaneously.

In the above-mentioned flash prevention circuit composed of the active switch, current limiter, first and second shunt resistors, when the warning light control circuit starts to conduct, the starting pulse wave of the Data Bus is blocked by the current limiter, and the gate of the active switch is coupled to the first and second shunt resistors and the Input Voltage Source to provide a conduction signal, and the drain of the active switch is coupled to the Signal Processor Power Supply to obtain Data, Clock Pulse and ID Information. And the Flash Mode selects one of the flash modes to flash the light. Through the aforementioned circuit structure, the pulse wave at the startup moment will not cause the warning lights to flash, but the users can successfully execute the warning light operation after selecting the Flash Mode.

Another object of the present invention is to connect a current limiter and two resistors in series between the control signal source and the active switch, and the floating ends of the two resistors connected in series are coupled to a ground point. The first node between the two resistors is coupled to the gate of the active switch. The source of the active switch is coupled to the ground point. The drain of the active switch is coupled to the control input side of the signal processor through the Control Bus. The current limiter is composed of Diode.

Still another object of the present invention is that the Data Bus is further coupled to a data synchronization circuit, which comprises at least one data source. The data source includes synchronization signals and command signals. This data source is coupled to another set of active switches. The output end of another set of active switches is coupled to a data input side of the signal processor through a Data Bus.

The signal processor is coupled to a signal coupling circuit through the data output side coupled to the Data Bus to form signal and instruction synchronization between the data input side and the data output side.

Still another object of the present invention is that there is a second node between the data source and another set of active switches. The first side of the second node is coupled to an Input Voltage Source through a current limiter and a resistor. The second side of the second node is connected in series with another current limiter and another two resistors. Another set of active switches is composed of a first-level active switch and a second-level active switch. The floating ends of another two resistors connected in series are coupled to a ground point. The third node between the other two resistors is coupled to the gate of the first-level active switch. The sources of the first-level active switch and the second-level active switch are coupled to the ground point. The drain of the second-level active switch is coupled to the Data Bus and the data input side of the signal processor. The first end of the resistor is coupled to a Signal Processor Power Supply and the second end of the resistor is coupled to the drain of the second-level active switch. The current limiter and the other current limiter are composed of Diode.

Still another object of the present invention is that the signal coupling circuit comprises the Signal Processor Power Supply and two resistors connected in series. The floating end of the first resistor is coupled to the Signal Processor Power Supply. The fourth node formed between the first resistor and the second resistor and coupled to the Data Bus outside the data output side. The second resistor is coupled to the gate of an active switch, and the source of the active switch coupled to a ground point, and the drain of the active switch is connected in series with a resistor, which has a floating end coupled between the data source and the second node through a signal coupling line.

Still another object of the present invention is that there is another current limiter connected in series between the first shunt resistor and the Input Voltage Source. The Input Voltage Source is coupled to the positive terminal of the other current limiter, and the negative terminal of the other current limiter is coupled to the first shunt resistor.

DETAILED DESCRIPTION OF THE PREFERRED EMBODIMENT

In order to achieve the above objects and effects, the technical means and structures adopted by the present invention are described in detail below by way of a preferred embodiment accompanying with the annexed drawings so as to facilitate a complete understanding.

Figure 1:
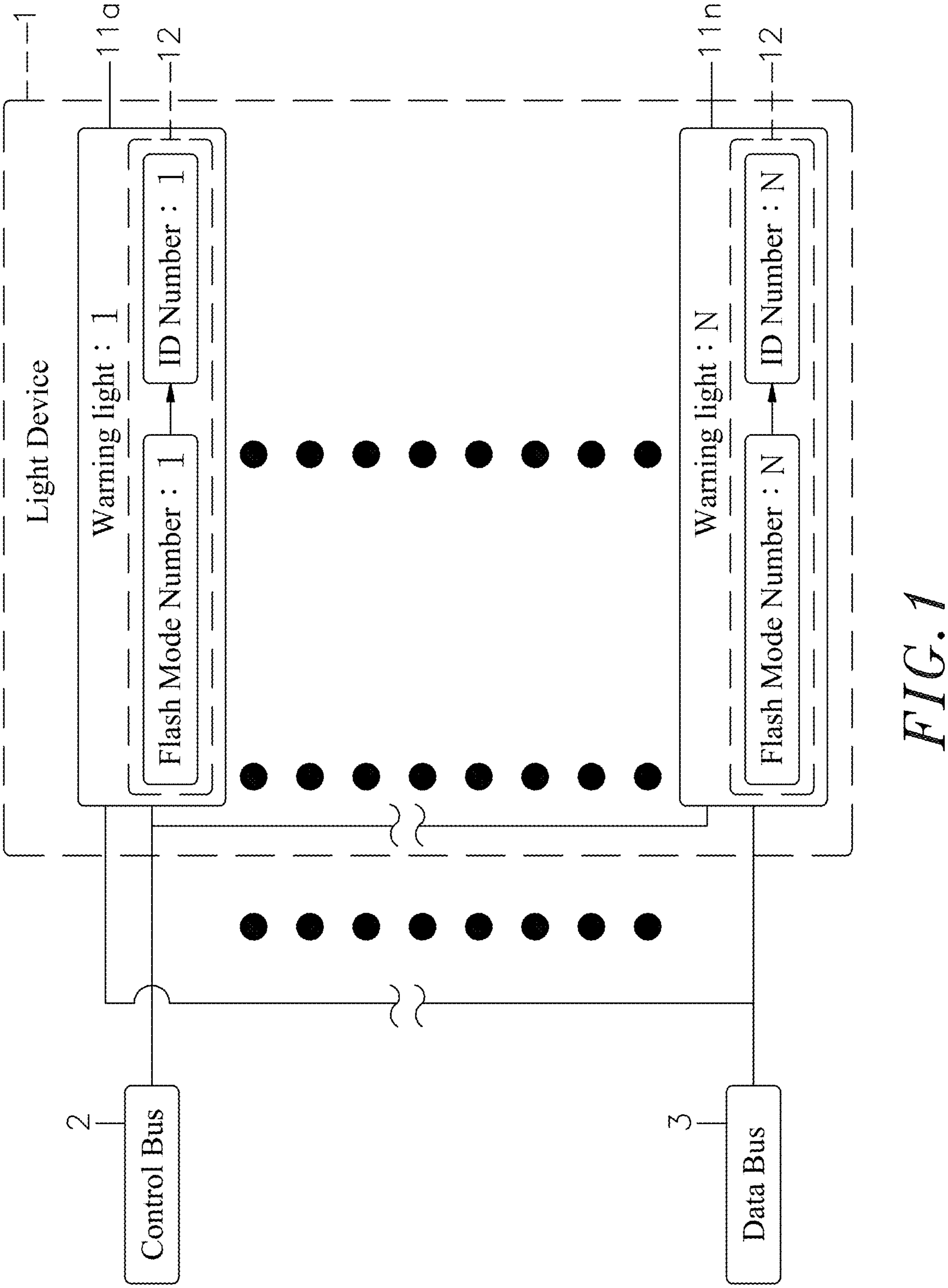
FIG. 1 is a function block diagram of a light device and its control architecture according to the present invention.
Figure 2:
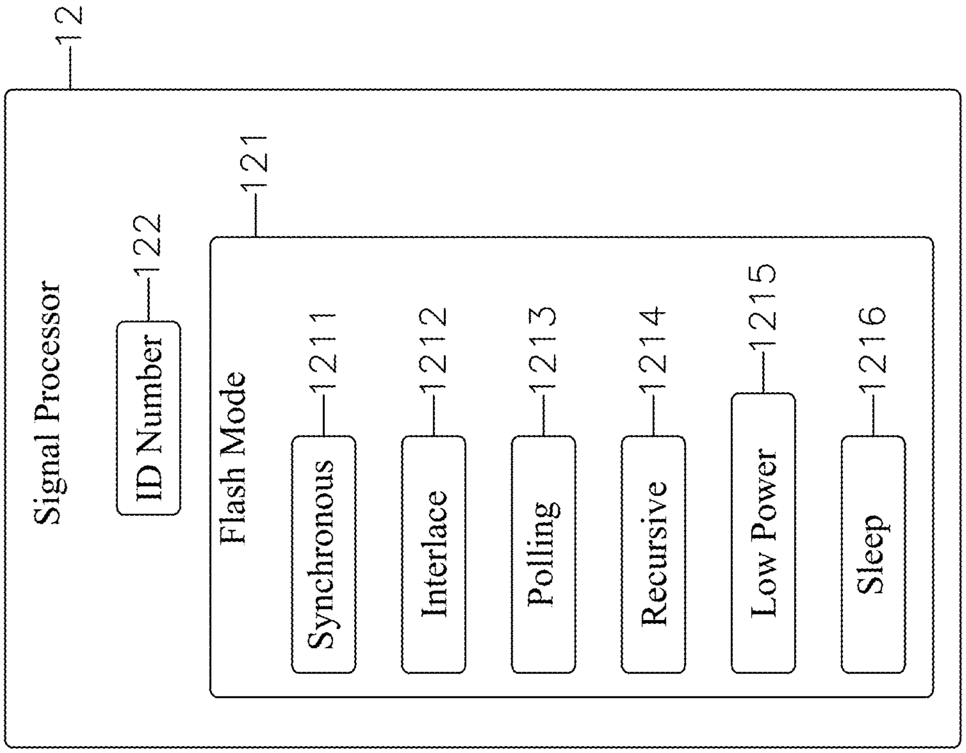
FIG. 2 is a function block diagram of the data stored in the signal processor of the present invention.
Figure 3:
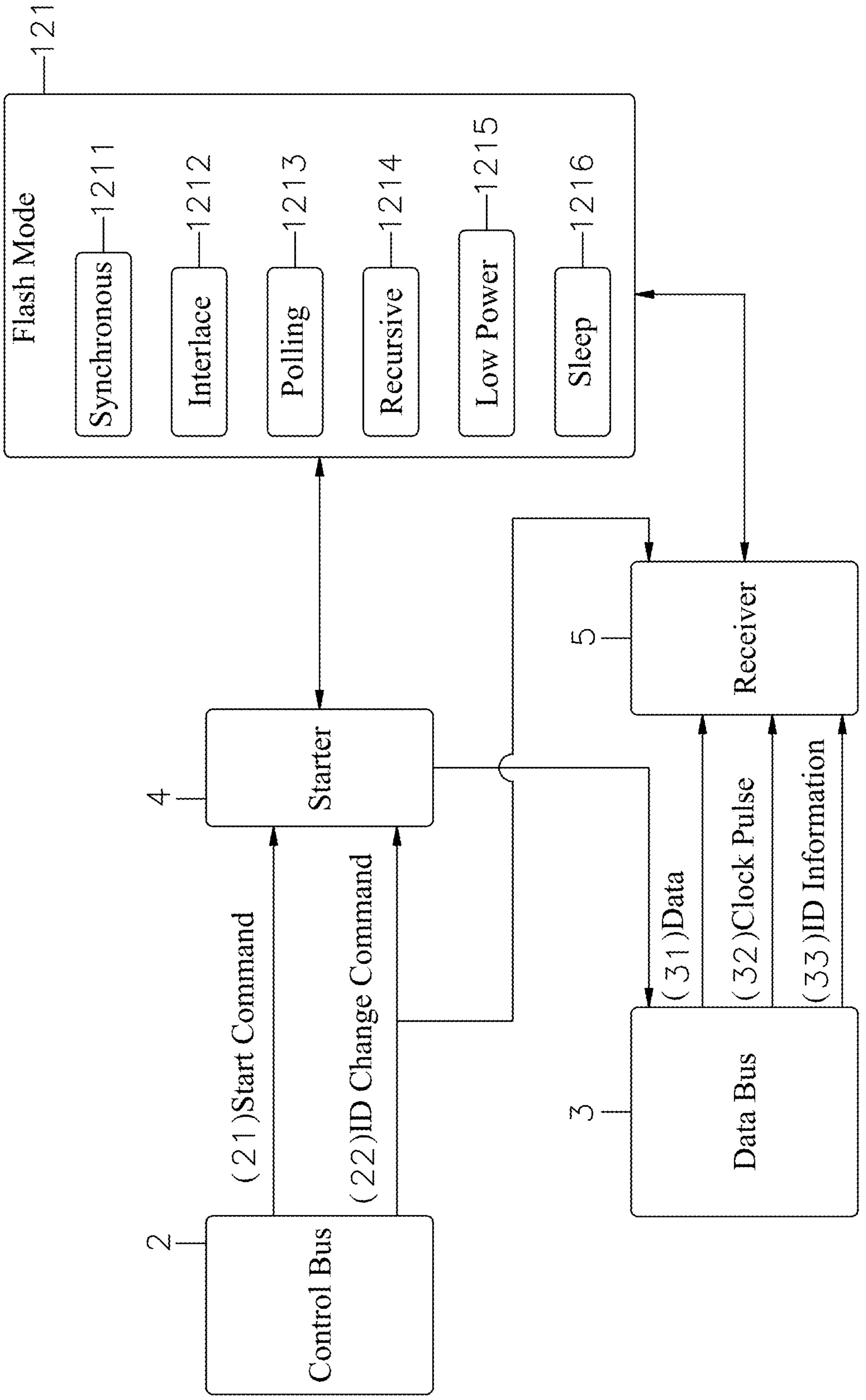
FIG. 3 is another function block diagram of the light device and its control architecture according to the present invention.

Please refer to FIGS. 1-3, which are function block diagram of a light device and its control architecture according to the present invention, function block diagram of the data stored in the signal processor of the present invention and another function block diagram of the light device and its control architecture according to the present invention. It can be clearly seen from the drawings that the warning light control circuit of the present invention comprises a Light Device (1), a Control Bus (2) and a Data Bus (3). Its main components and features are detailed as follows:

Please refer to FIG. 1, the Light Device (1) comprises a plurality of warning lights (11*a*~11*n*), and each warning light (11*a*~11*n*) is coupled to the Control Bus (2) and the Data Bus (3) through a signal line. Each warning light (11*a*~11*n*) comprises a signal processor (12), and the signal processor (12) is composed of a Micro Control Unit (MCU) or a Central Processing Unit (CPU).

Please refer to FIG. 2, where the signal processor (12) of each of the plurality of warning lights (11*a*~11*n*) has stored a Flash Mode (121) and an ID Number (122). The Flash Mode (121) includes the modes of Synchronous (1211), Interlace (1212), Polling (1213), Recursive (1214), Low Power (1215) and Sleep (1216). In addition to the aforementioned Flash Mode (121), the Starter (4) can also use the Data Bus (3) to control a plurality of Receivers (5) to flash in different modes (for example: the first Receivers (5) is to do Synchronous (1211), the second Receivers (5) is to do Polling (1213), and the third Receivers (5) is to do Interlace (1212)). The aforementioned control of the flashing of the plurality of Receivers (5) by the Starter (4) is also within the protection scope of the present invention. The ID Number (122) is determined by the Start Command (21) and ID change command (22) of the Control Bus (2). Therefore, the ID Numbers (122) of the warning lights (11*a*~11*n*) are in a floating state, but they can only be changed by accepting the aforementioned Start Command (21) and ID change command (22).

Please refer to FIG. 3, the Control Bus (2) sends a Start Command (21) to notify a plurality of warning lights (11*a*~11*n*), set the Flash Mode (121) and sequentially number each warning light (11*a*~11*n*) starting from 1, and use the Flash Mode (121) numbers to synchronously set the ID Number (122) of each warning light (11*a*~11*n*). It sets a predetermined ID Number (122) of these warning lights (11*a*~11*n*) as a Starter (4), and the rest of the ID Numbers (122) as Receivers (5). The warning light (11*a*~11*n*) set as a Starter (4) receives a Start Command (21) through the Control Bus (2) and transmits a Data (31), a Clock Pulse (32) and an ID Information (33) from the Data Bus (3), and select one of the Flash Modes (121) (Synchronous (1211), Interlace (1212), Polling (1213), Recursive (1214), Low Power (1215) or Sleep (1216)) to flash the light. The warning lights (11*a*~11*n*) set as Receivers (5) obtain the Data (31), the Clock Pulse (32) and the ID Information (33) through the Data Bus (3), and the Flash Modes (121) of the Receivers (5) and the Starter (4) perform synchronous, asynchronous, Low Power (1215) or Sleep (1216) light flashing.

The above-mentioned the plurality of warning lights (11*a*~11*n*) are synchronously set the ID Number (122) of each warning light (11*a*~11*n*) through the Flash Mode (121) number. Generally speaking, the one set the ID Number (122) as 1 is the Starter (4). But the present invention is not self-limiting. Each ID Number (122) can be set as the Starter (4) through the Control Bus (2). For example: the ID Number (122) 2, 5, 8 and other numbers other than 1 may also be set as the Starter (4). The mode of setting the warning light (11*a*~11*n*) of any ID Number (122) through the Control Bus (2) as the Starter (4) is also protected by the present invention.

During the process of the above-mentioned Starter (4) and Receivers (5) performing synchronous or asynchronous light flashing respectively, if the ID change command (22) sent by its common Control Bus (2) is received, then executes the identity change of the Starter (4) and the plurality of Receivers (5). The specific method is that before the Starter (4) and the Receivers (5) change their identities, the Receivers (5) first suspend the current Flash Mode (121) and then execute a Self Flash Mode. The Control Bus (2) will re-send a Start Command (21) to notify the plurality of warning lights (11*a*~11*n*), set the Flash Mode (121) and sequentially number each warning light (11*a*~11*n*) starting from 1, and use the Flash Mode (121) numbers to simultaneously set the ID Number (122) of each warning light (11*a*~11*n*).

Figure 4:
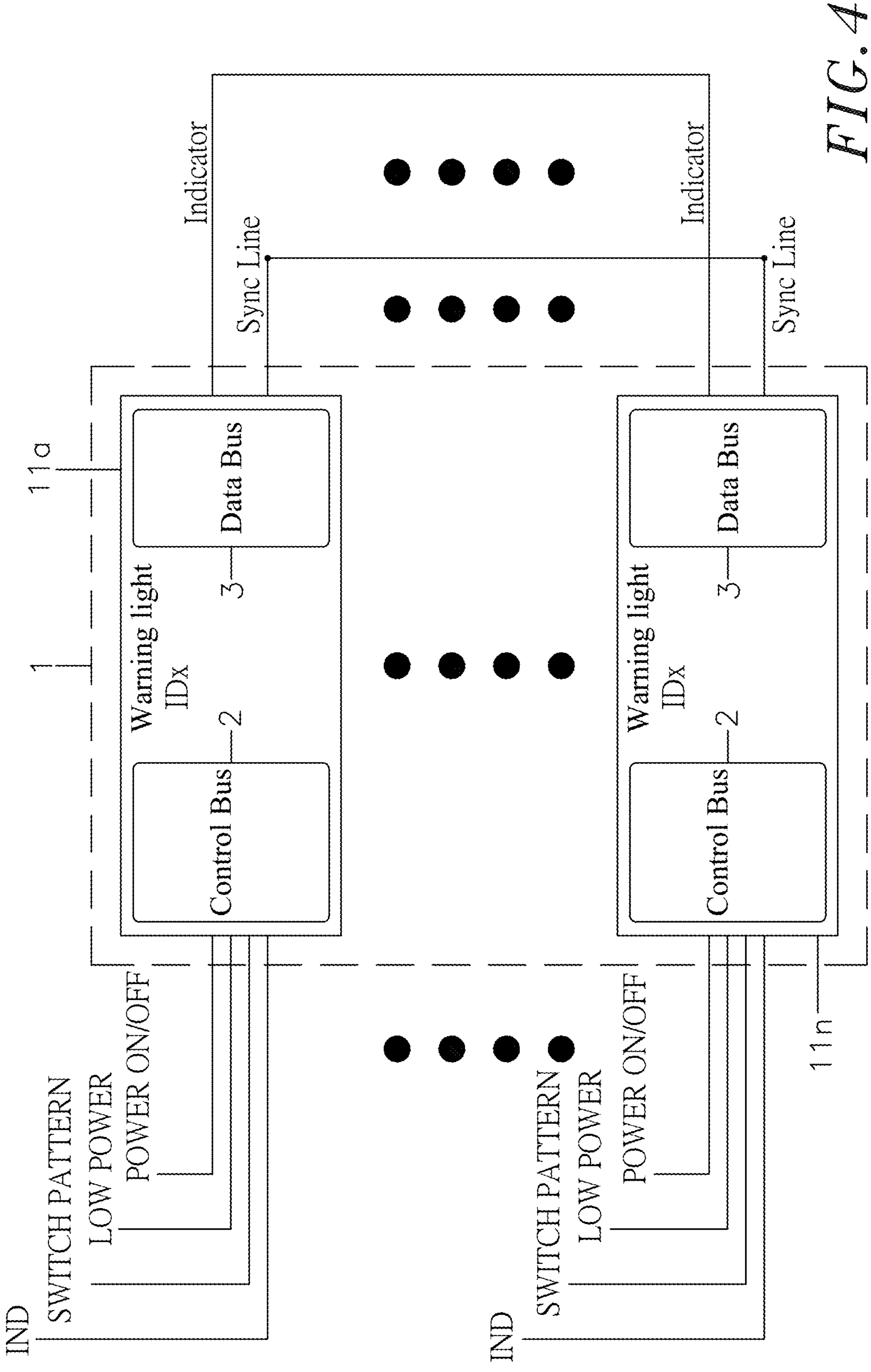
FIG. 4 is a schematic diagram of the connection of the light device and its circuit according to the present invention.
Figure 5:
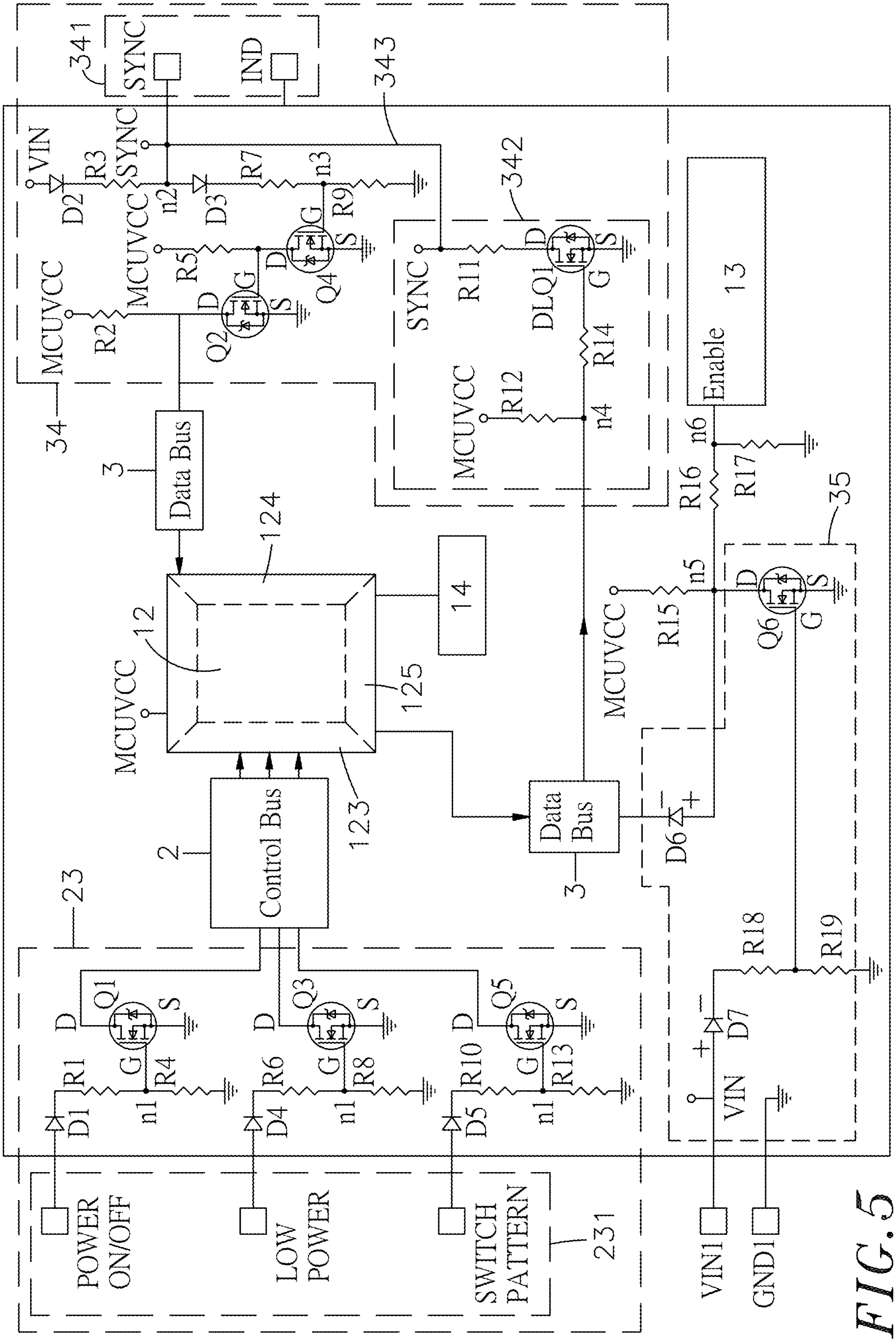
FIG. 5 is a circuit diagram of one single warning light of the present invention.

Please refer to FIGS. 3, 4 and 5, where the signal processor (12) internally stores data of a plurality of Flash Modes (121), and use the Flash Mode (121) numbers to simultaneously set the ID Numbers (122) of the plurality of warning lights (11*a*~11*n*), and set a predetermined ID Number (122) of these warning lights (11*a*~11*n*) as a Starter (4), and the rest of the ID Numbers (122) as Receivers (5).

A control circuit (23) comprises at least one control signal source (231). The control signal source (231) is coupled to an active switch (Q1, Q3 or Q5). The output end of the active switch (Q1, Q3 or Q5) is coupled to a control input side (123) of the signal processor (12) through a Control Bus (2).

A warning light control IC (13) is coupled to the warning lights (11*a*~11*n*) and coupled to the Data Bus (3) with the signal processor (12) through a data output side (125). A start-up flash prevention circuit (35) is provided between the warning light control IC (13) and the Data Bus (3). The start-up flash prevention circuit (35) comprises an active switch (Q6), a current limiter (D6), a first shunt resistor (R18) and a second shunt resistor (R19). The gate (G) of the active switch (Q6) is coupled between the first shunt resistor (R18) and the second shunt resistor (R19). The other end of the first shunt resistor (R18) is coupled to the Input Voltage Source (Vin). The other end of the second shunt resistor (R19) is coupled to the ground point. The source (S) of the active switch (Q6) is also electrically coupled to the ground point. The drain (D) of the active switch (Q6) is coupled to the positive terminal (+) of the current limiter (D6), and the negative terminal (−) of the current limiter (D6) is coupled to the Data Bus (3). When the warning light control circuit is turned on, the starting pulse wave of the Data Bus (3) is blocked by the current limiter (D6), so that the warning light control IC (13) will not be turned on instantaneously.

Another current limiter (D7) is connected in series between the above-mentioned first shunt resistor (R18) and the Input Voltage Source (Vin). The Input Voltage Source (Vin) is coupled to the positive terminal of another current limiter (D7), and the negative terminal of another current limiter (D7) is coupled to the first shunt resistor (R18).

A current limiter (D1, D4 or D5) and two resistors ([R1, R4], [R6, R8] or [R10, R13]) are connected in series between the above-mentioned control signal source (231) and the active switch (Q1, Q3 or Q5). The floating ends of the two resistors ([R1, R4], [R6, R8] or [R10, R13]) connected in series are coupled to a ground point. The first node (n1) between the two resistors ([R1, R4], [R6, R8] or [R10, R13]) is coupled with the gate (G) of the active switch (Q1, Q3 or Q5). The source (S) of the active switch (Q1, Q3 or Q5) is coupled to a ground point. The drain (D) of the active switch (Q1, Q3 or Q5) is coupled to the control input side (123) of the signal processor (12) through the Control Bus (2). The current limiter (D1, D4 or D5) is composed of a Diode.

The above-mentioned control signal source (231) comprises Power On/Off, Low Power Signal (LOW POWER), Switch Pattern and Instruction Signal (IND).

A data synchronization circuit (34) comprises at least one data source (341). The data source (341) is coupled with another set of active switches (Q2, Q4, DLQ1). The output terminals of another set of active switches (Q2, Q4, DLQ1) are coupled to a data input side (124) of the signal processor (12) through a Data Bus (3). The signal processor (12) is coupled with a signal coupling circuit (342) through a data output side (125) coupled to the Data Bus (3) to form signal and instruction synchronization between the data input side (124) and the data output side (125).

There is a second node (n2) between the above-mentioned data source (341) and the other group of active switches (Q2, Q4). The first side of the second node (n2) is coupled to an Input Voltage Source (VIN) through a current limiter (D2) and a resistor (R3). Another current limiter (D3) and the other two resistors (R7, R9) are connected in series to the second side of the second node (n2). The other group of active switches (Q2, Q4) is composed of a first-level active switch (Q4) and a second-level active switch (Q2), and the floating ends of the other two resistors (R7, R9) connected in series are coupled to a ground point. The third node (n3) between the other two resistors (R7, R9) is coupled to the gate (G) of the first-level active switch (Q4). The sources(S) of the first-level active switch (Q4) and the second-level active switch (Q2) are coupled to the ground point. The drain (D) of the second-level active switch (Q2) is coupled to the Data Bus (3) and the data input side (124) of the signal processor (12). The first end of the resistor (R2) is coupled to the Signal Processor Power Supply (MCUVCC), and the second end thereof is coupled to the drain (D) of the second-level active switch (Q2). The drain (D) of the first-level active switch (Q4) is coupled to the gate (G) of the second-level active switch (Q2). The first end of the resistor (R5) is coupled to the Signal Processor Power Supply (MCUVCC), and the second end thereof is coupled to the drain (D) of the first-level active switch (Q4). The current limiter (D2) and the other current limiter (D3) are composed of Diode.

The above-mentioned data source (341) comprises a Synchronization Signal (SYNC) and an Instruction Signal (IND).

The above-mentioned signal coupling circuit (342) comprises a Signal Processor Power Supply (MCUVCC) and two resistors (R12, R14) connected in series. The floating end of the first resistor (R12) is coupled to the Signal Processor Power Supply (MCUVCC), and a fourth node (n4) coupled to the Data Bus (3) outside the data output side (125) is formed between the first resistor (R12) and the second resistor (R14). The second resistor (R14) is coupled to the gate (G) of an active switch (DLQ1). The source (S) of the active switch (DLQ1) is coupled to the ground point. The drain (D) of the active switch (DLQ1) is connected in series with another resistor (R11), and the floating end of another resistor (R11) is coupled between the Synchronization Signal (SYNC) of the data source (341) and the second node (n2) through a signal coupling line (343).

A Signal Processor Power Supply (MCUVCC) and three resistors (R15, R16, R17) connected in series are sequentially provided between the Data Bus (3) outside the data output side (125) and the warning light control IC (13). The floating end of the first resistor (R15) is coupled to the Signal Processor Power Supply (MCUVCC). A fifth node (n5) coupled to the Data Bus (3) is formed between the first resistor (R15) and the second resistor (R16). A sixth node (n6) coupled to the Enable of the warning light control IC (13) is formed between the second resistor (R16) and the third resistor (R17). The floating end of the third resistor (R17) is coupled to a ground point.

The above-mentioned active switches (Q1, Q2, Q3, Q4, Q5, Q6, DLQ1) are composed of an N-channel enhancement type metal oxide semi-field effect transistor (N-Channel E-MOSFET). The N-channel enhancement type metal oxide semi-field effect transistor is coupled with a Zener Diode that can prevent electrostatic discharge (ESD) between its source (S) and drain (D).

The above-mentioned signal processor (12) has a built-in or external register (14) capable of storing the Data (31), the Clock Pulse (32) and the ID Information (33). The register (14) is composed of a Non-Volatile Memory (NVM).

In actual operation of the warning light control circuit of the present invention, by means of the start-up flash prevention circuit (35) composed of the active switch (Q6), the current limiter (D6), the first shunt resistor (R18) and the second shunt resistor (R19), when the warning light control circuit starts to conduct, the starting pulse wave of the Data Bus (3) is blocked by the current limiter (D6), so that the warning light control IC (13) will not be turned on instantaneously. The reverse voltage range that current limiter (D6) can withstand is 100~1000V (volts). Then the plurality of warning lights (11*a*~11*n*) receive a start command to set a Flash Mode (121). The start command refers to the multiple control signals of Power On/Off, Low Power Signal, Switch Pattern and Instruction Signal (IND) provided by the control signal source (231). The multiple control signals cause the gate (G) of the plurality of active switches (Q1, Q3, Q5) to generate forward current. The output terminals of the plurality of active switches (Q1, Q3, Q5) transmit multiple control signals to the control input side (123) of the signal processor (12). After receiving the control command, the signal processor (12) uses its internally stored Flash Mode (121) to synchronously set the ID Number (122) of each of the plurality of warning lights (11*a*~11*n*), and set a predetermined ID Number (122) of the plurality of warning lights (11*a*~11*n*) as a Starter (4), and set the rest of ID Numbers (122) as Receivers (5).

Following the above, the warning light (11*a*~11*n*) set as a Starter (4) receives multiple control signals through the Control Bus (2), and transmits the Data (31), the Clock Pulse (32) and the ID Information (33) through the Data Bus (3) outside the data output side (125) to choose one of the Flash Modes (121) (Synchronous (1211), Interlace (1212), Polling (1213), Recursive (1214), Low Power (1215) or Sleep (1216)) to flash the light. The warning lights (11*a*~11*n*) set as Receivers (5) obtain the Data (31), the Clock Pulse (32) and the ID Information (33) through the transmission of the Data Bus (3) and the warning light control IC (13). The Flash Modes (121) of the plurality of Receivers (5) and the Starter (4) can flash the light synchronously or asynchronously, and the Starter (4) can transmit the Data (31), the Clock Pulse (32) and the ID Information (33) through the Data Bus (3) to control the plurality of Receivers (5). Furthermore, the transmission and synchronization of instructions between the Starter (4) and the plurality of Receivers (5) require the coupling of the signal coupling circuit (342) and the signal coupling line (343) to the data source (341), and the Synchronization Signal (SYNC) and Instruction Signal (IND) of data source (341) is coupled to the Data Bus (3) and the data input side (124) of the signal processor (12) through the drain (D) of the second-level active switch (Q2), so that the signals and instructions between the data input side (124) and the data output side (125) can be synchronized.

Please refer to FIG. 3 and FIG. 5. After receiving the ID change command (22) transmitted by the Switch Pattern of the control signal source (231), the Control Bus (2) of the Starter (4) and the plurality of Receivers (5) perform the changes of the Flash Mode (121), the ID Number (122), the Starter (4) and the plurality of Receivers (5), so that forming the change of the Flash Mode (121) of the plurality of warning lights (11*a*~11*n*).

The main feature of the present invention is that the start-up flash prevention circuit (35) composed of the active switch (Q6), the current limiter (D6), the first shunt resistor (R18) and the second shunt resistor (R19), when the warning light control circuit starts to conduct, the starting pulse wave of the Data Bus (3) is blocked by the current limiter (D6). The gate (G) of the active switch (Q6) is coupled to the first shunt resistor (R18), the second shunt resistor (R19) and the Input Voltage Source (Vin) to provide a conduction signal. The drain (D) of the active switch (Q6) is coupled to the Signal Processor Power Supply (MCUVCC) to obtain Data (31), Clock Pulse (32) and ID Information (33), and select one of the Flash Modes (121) to flash the light. Through the above-mentioned circuit structure, the pulse wave at the startup moment will not cause the warning lights (11*a*~11*n*) to flash, but the user can successfully execute the warning light operation after selecting the Flash Mode (121).

The above description is only preferred embodiments of the present invention and do not limit the patent scope of the present invention. Therefore, all simple modifications and equivalent structural changes made by using the description and drawings of the present invention shall be included in the patent scope of the present invention and shall be clearly stated.

In summary, the above-mentioned warning light control circuit capable of preventing start-up flashing of the present invention can indeed achieve its effect and purpose when used. Therefore, this invention is truly an invention with excellent practicality and meets the application requirements for an invention patent, so the application must be filed in accordance with the law. We hope that the review committee will approve this case as soon as possible to protect the inventor's hard work. If the review committee has any doubts, please feel free to send us a letter for instructions. The inventor will do our best to cooperate. We sincerely appreciate it.

What the invention claimed is:

1. A warning light control circuit capable of preventing start-up flashing, comprising:

a signal processor having stored a data of a plurality of flash modes therein, said signal processor using the numbers of said flash modes to simultaneously set an identification (ID) number of each of a plurality of warning lights, and set a predetermined said identification (ID) number of said warning lights as a starter and the rest of said identification (ID) numbers as receivers;

a control circuit comprising at least a control signal source, said control signal source being coupled to an active switch (Q1, Q3 or Q5), the output end of said active switch (Q1, Q3 or Q5) coupled to a control input side of said signal processor through a control bus; and a warning light control integrated circuit (IC) coupled to said warning lights and coupled with said signal processor to a data bus through a data output side, a start-up flash prevention circuit provided between said warning light control integrated circuit (IC) and said data bus, said start-up flash prevention circuit comprising an active switch (Q6), a current limiter (D6), a first shunt resistor (R18) and a second shunt resistor (R19), a gate (G) of said active switch (Q6) coupled between said first shunt resistor (R18) and said second shunt resistor (R19), the opposite end of said first shunt resistor (R18) coupled to an input voltage source (Vin), the opposite end of said second shunt resistor (R19) coupled to a ground point, and a source(S) of said active switch (Q6) also coupled to the ground point, a drain (D) of said active switch (Q6) coupled to the positive terminal (+) of said current limiter (D6), said current limiter (D6) having the negative terminal (−) coupled to said data bus; and wherein when the warning light control circuit starts to turn on, the starting pulse wave of said data bus is blocked by said current limiter (D6) to prevent said warning light control integrated circuit (IC) from being turned on instantaneously.

2. The warning light control circuit capable of preventing start-up flashing as claimed in claim 1, wherein said active switches (Q1, Q3, Q5, Q6) are composed of an N-channel enhancement type metal oxide semi-field effect transistor, and said N-channel enhancement type metal oxide semi-field effect transistor has a zener diode coupled between said source(S) and said drain (D) to prevent electrostatic discharge.

3. The warning light control circuit capable of preventing start-up flashing as claimed in claim 1, wherein a current limiter (D1, D4 or D5) and two resistors ((R1, R4), (R6, R8) or (R10, R13)) connected in series between said control signal source and said active switch (Q1, Q3 or Q5), said two resistors ((R1, R4), (R6, R8) or (R10, R13)) connected in series having a floating end thereof coupled to a ground point, and a first node (n1) between said two resistors ((R1, R4), (R6, R8) or (R10, R13)) coupled to the gate (G) of said active switch (Q1, Q3 or Q5), the source(S) of said active switch (Q1, Q3 or Q5) coupled to the ground point and the drain (D) of said active switch (Q1, Q3 or Q5) coupled to said control input side of said signal processor through said control bus, said current limiter (D1, D4 or D5) being composed of a diode.

4. The warning light control circuit capable of preventing start-up flashing as claimed in claim 1, wherein said data bus further coupled to a data synchronization circuit, said data synchronization circuit comprising at least a data source, said data source comprising a synchronization signal (SYNC) and an instruction signal (IND), said data source being coupled with a second set of active switches (Q2, Q4, DLQ1), the respective output terminals of second set of said active switches (Q2, Q4, DLQ1) coupled to a data input side of said signal processor through said data bus, said signal processor being coupled to a signal coupling circuit through the said data output side coupled to said data bus to form signal and instruction synchronization between said data input side and said data output side.

5. The warning light control circuit capable of preventing start-up flashing as claimed in claim 4, wherein a second node (n2) provided between said data source and two active switches (Q2, Q4) of said second set of active switches (Q2, Q4, DLQ1), the first side of said second node (n2) coupled to said input voltage source (VIN) through a current limiter (D2) and a resistor (R3) and the second side thereof connected with a second current limiter (D3) and two resistors (R7, R9) in series, said two active switches (Q2, Q4) of said second set of active switches (Q2, Q4, DLQ1) being composed of a first-level active switch (Q4) and a second-level active switch (Q2), the floating end of said two resistors (R7, R9) connected in series coupled to the ground point and a third node (n3) between said two resistors (R7, R9) coupled to the gate (G) of said first-level active switch (Q4), said first-level active switch (Q4) and the source(S) of said second-level active switch (Q2) being coupled to a ground point, the drain (D) of said second-level active switch (Q2) coupled to said data bus and said data input side of said signal processor, the first end of a resistor (R2) coupled to a signal processor power supply (MCUVCC) and the second end thereof coupled to the drain (D) of said second-level active switch (Q2), the drain (D) of said first-level active switch (Q4) being coupled to the gate (G) of said second-level active switch (Q2), the first end of a resistor (R5) coupled to said signal processor power supply (MCUVCC) and the second end thereof coupled to the drain (D) of said first-level active switch (Q4), said current limiter (D2) and said second current limiter (D3) being composed of said diode.

6. The warning light control circuit capable of preventing start-up flashing as claimed in claim 4, wherein said signal coupling circuit comprises said signal processor power supply (MCUVCC) with a first resistor (R12) and a second resistor (R14) connected in series, the floating end of said first resistor (R12) coupled to said signal processor power supply (MCUVCC), a fourth node (n4) formed between said first resistor (R12) and said second resistor (R14) and coupled to said data bus outside said data output side, said second resistor (R14) being coupled to the gate (G) of said active switch (DLQ1), the source(S) of said active switch (DLQ1) coupled to a ground point, the drain (D) of said active switch (DLQ1) connected in series with a resistor (R11), the floating end of said resistor (R11) coupled between said data source and said second node (n2) through a signal coupling line.

7. The warning light control circuit capable of preventing start-up flashing as claimed in claim 1, further sequentially comprising a-said signal processor power supply (MCUVCC), and three resistors (a first resistor (R15), a second resistor (R16) and a third resistor (R17)) connected in series between said data bus outside said data output side and said warning light control integrated circuit (IC), said first resistor (R15) having a floating end thereof coupled to said signal processor power supply (MCUVCC), a fifth node (n5) formed between said first resistor (R15) and said second resistor (R16) and coupled to said data bus, a sixth node (n6) formed between said second resistor (R16) and said third resistor (R17) and coupled to an enable of said warning light control integrated circuit (IC), the floating end of said third resistor (R17) coupled to a ground point.

8. The warning light control circuit capable of preventing start-up flashing as claimed in claim 1, wherein said signal processor selectively comprises a built-in or external register to store the data, a clock pulse and an ID Information, said register being composed of a non-volatile memory.

9. The warning light control circuit capable of preventing start-up flashing as claimed in claim 1, wherein said control signal source comprises a power on/off, a low power, a switch pattern, and an indicator.

10. The warning light control circuit capable of preventing start-up flashing as claimed in claim 1, wherein a second current limiter (D7) connected in series provided between said first shunt resistor (R18) and said input voltage source (Vin), said input voltage source (Vin) being coupled to the positive terminal of said second current limiter (D7), the negative terminal of said second current limiter (D7) coupled to said first shunt resistor (R18).

11. The warning light control circuit capable of preventing start-up flashing as claimed in claim 1, wherein said current limiter (D6) is capable of withstanding a reverse voltage range of 100~1000V (volts).

12. A warning light control circuit capable of preventing start-up flashing, comprising:

a signal processor (12);

a control circuit comprising at least a control signal source, said control signal source being coupled to an active switch (Q1, Q3 or Q5), the output end of said active switch (Q1, Q3 or Q5) coupled to a control input side of said signal processor through a control bus; and a warning light control integrated circuit (IC) coupled to a plurality of warning lights, each said warning light having electrically connected a start-up flash prevention circuit, said start-up flash prevention circuit comprising an active switch (Q6), a current limiter (D6), a first shunt resistor (R18) and a second shunt resistor (R19), a gate (G) of said active switch (Q6) coupled between said first shunt resistor (R18) and said second shunt resistor (R19), the opposite end of said first shunt resistor (R18) coupled to an input voltage source (Vin), the opposite end of said second shunt resistor (R19) coupled to a ground point, a source(S) of said active switch (Q6) coupled to the ground point, a drain (D) of said active switch (Q6) coupled to the positive terminal (+) of said current limiter (D6); and wherein when the warning light control circuit starts to turn on, the starting pulse wave is blocked by said current limiter (D6) to prevent said warning light control integrated circuit (IC) from being turned on instantaneously.

13. The warning light control circuit capable of preventing start-up flashing as claimed in claim 12, further comprising a second current limiter (D7) connected in series between said first shunt resistor (R18) and said input voltage source (Vin), said input voltage source (Vin) being coupled to the positive terminal of said second current limiter (D7), the negative terminal of said second current limiter (D7) coupled to said first shunt resistor (R18).

14. The warning light control circuit capable of preventing start-up flashing as claimed in claim 12, wherein said current limiter (D6) is capable of withstanding a reverse voltage range of 100~1000V (volts).

* * * * *